United States Patent

[11] 3,565,398

| [72] | Inventors | James D. Floria<br>Westport, Conn.;<br>James Sidles, West Richfield, Ohio |
|------|-----------|-----|
| [21] | Appl. No. | 786,313 |
| [22] | Filed | Dec. 23, 1968 |
| [45] | Patented | Feb. 23, 1971 |
| [73] | Assignee | The B. F. Goodrich Company<br>New York, N.Y. |

[54] PENUMATIC BAG JACK
3 Claims, 5 Drawing Figs.

[52] U.S. Cl. .................................................. 254/93, 92/35
[51] Int. Cl. .................................................. B66f 3/24
[50] Field of Search .................................................. 254/93; 92/34, 35; 29/454; 236/99; 269/22

[56] References Cited
UNITED STATES PATENTS
| 3,305,217 | 2/1967 | Wijergangs.................... | 254/93 |
| 3,352,211 | 11/1967 | Jorgensen....................... | 29/454X |

Primary Examiner—Othell M. Simpson
Assistant Examiner—David R. Melton
Attorneys—Harold S. Meyer and W. A. Shira, Jr.

ABSTRACT: A pneumatic bag jack suitable for use in changing tires of automobiles consisting of a cylindrical bag of impervious flexible material of a diameter several times its axial length and with annular corrugations in the flat end faces immediately inside the periphery.

PATENTED FEB 23 1971
3,565,398
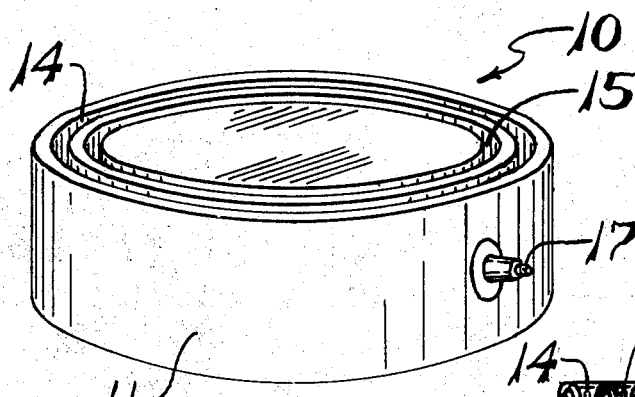
Fig.1
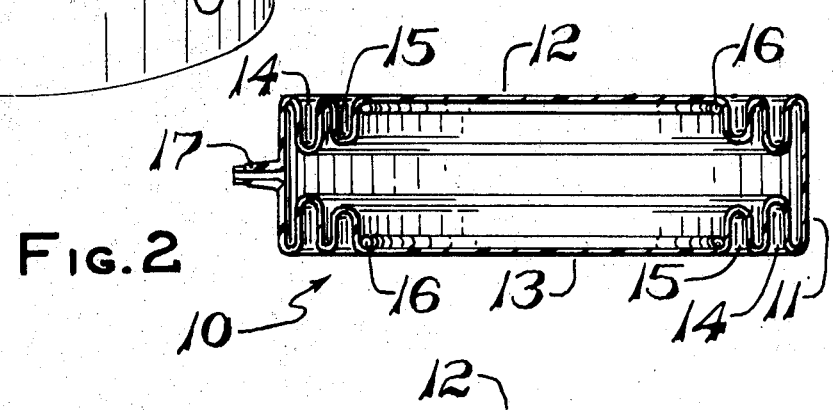
Fig.2
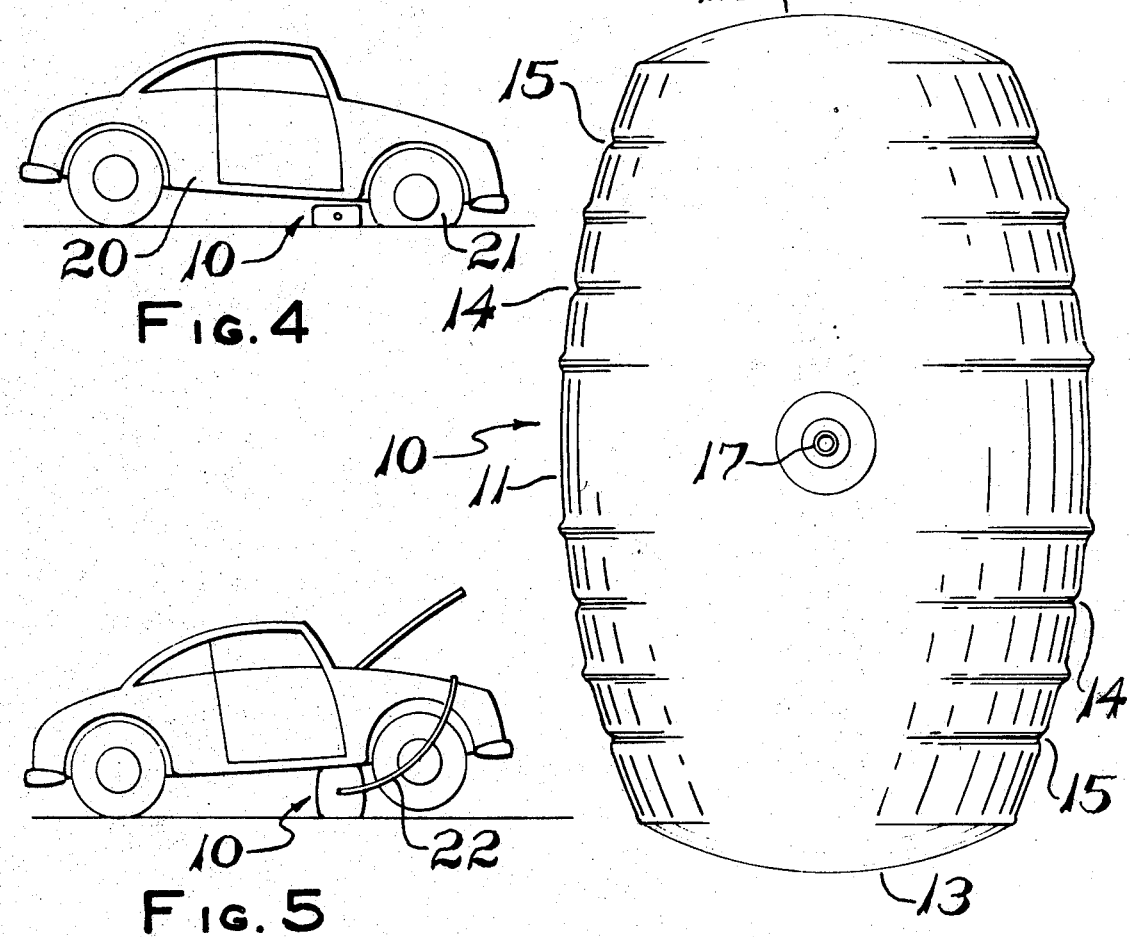
Fig.4
Fig.5
Fig.3

PENUMATIC BAG JACK

BACKGROUND OF THE INVENTION

Pneumatic bag jacks have been known for many years and have found limited use in some special situations, but have generally been found to be less convenient than mechanical jacks for one reason or another. If so arranged as to collapse spontaneously on deflation, they have tended to be of such great dimension as to be troublesome to manage, or have tended to be unstable in use so as to be unsatisfactory without guides of a rigid or stiff material. Instability has been especially pronounced in the case of bag jacks in the shape of cylindrical bellows having folds or corrugations in the cylindrical walls of the device.

SUMMARY OF THE INVENTION

In this invention, a pneumatic bag jack is provided which is made entirely or principally of a flexible but essentially inextensible impervious material so that it can be inflated to provide a lifting force. This device on its deflated form has the general shape of a shallow cylinder, that is to say it has a cylindrical outer wall with a diameter several times as great as the axial length of the cylinder with its ends closed by generally flat upper and lower faces. One or both of the end faces are provided with one or more annular corrugations of the flexible material immediately inside the periphery so as to permit unfolding of the corrugations to develop an extensive lift during inflation, but without serious diminution of the area of the flat end face against which the inflation pressure must work to provide the desired lift.

DESCRIPTION OF THE DRAWINGS

In the accompanying drawings:

FIG. 1 is a perspective view of the pneumatic bag jack of this invention;

FIG. 2 is a cross-sectional view;

FIG. 3 is a view showing the approximate shape of the device when fully inflated but without load;

FIG. 4 shows the manner in which the pneumatic bag jack can be placed under an automobile having a flat tire; and FIG. 5 shows the automobile lifted by inflation of the jack so as to permit changing of the tire.

DESCRIPTION OF THE PREFERRED EMBODIMENT

In the preferred embodiment of the pneumatic bag jack 10 shown in FIGS. 1 and 2, the device has a cylindrical outer surface 11 with a diameter preferably three or four times the axial length or height of the cylinder. The upper and lower ends of the cylinder are closed by faces 12 and 13 which are generally flat except for a pair of inwardly directed corrugations 14 and 15 immediately inside of the periphery of at least one and preferably both flat end faces 12 and 13 of the device.

The entire device is preferably made of a suitable tough, flexible, puncture resistant material such as rubberized fabric or one of the tough, flexible plastics. The material should be one which retains adequate flexibility over the usual range of outdoor temperatures, but should be only slightly extensible. If the material chosen is rubberized fabric, pieces of suitable size and shape are joined in the usual way and are then folded into the collapsed shape with the desired number of corrugations in the periphery of the end faces and vulcanized into a unitary article in this shape. If a flexible plastic material is chosen, it can be formed in any of several well-known manners such as by blow molding or rotational casting to form the material into the shape which it should have when in a deflated condition.

If desired, a ring 16, preferably of flexible material, can be included at the margin of the planar portion of each end face 12 and 13 to assist in the construction of the device and to help maintain the ends in a nearly flat shape when bearing against irregular surfaces in use. A conventional inflation valve 17 is provided, preferably in the cylindrical side face 11.

An inflatable bag jack made in the manner described above with a diameter of about 12 inches and a height between the end faces of about 3½ inches can easily lift even a heavy automobile a distance of over a foot when inflated to a pressure not over 30 pounds per square inch. As indicated in FIG. 4, the deflated pneumatic bag jack 10 is of such a dimension as to fit under the side of the body of a standard automobile 20 closely adjacent to a flat tire 21. As shown in FIG. 5, it can then be inflated in a short time to lift the vehicle off the flat tire, either by a hand pump or by a hose connection 22 from a power driven pump such as one of the several kinds of pumps which can be connected to the engine of the automobile itself.

As the pneumatic bag jack is inflated, the corrugations 14 and 15 in the upper and lower end faces 12 and 13 gradually unfold as the end faces are separated by the pneumatic pressure, lifting the automobile body or other load imposed on it until the corrugations have all been nearly straightened out and the jack has assumed a somewhat barrellike shape as shown in FIG. 3 and FIG. 5. The expansion is automatically self-limiting since the flexible but relatively inextensible material of which the jack is made will restrict further expansion after the corrugations in each end have been almost fully straightened out.

When the tire has been changed or the need for the jack has been terminated in some other way, the inflation valve 17 is opened and the air is permitted to escape. The inherent elasticity of the material originally shaped to form the corrugations in the end faces causes the material to contract and tend to fold itself up spontaneously along the original fold lines until it is restored to its compact collapsed shape, but the restoration of the original shape can be assisted by gentle hand pressure if desired.

The pneumatic bag jack of this invention does not require pressure higher than that ordinarily used for tire inflation and is consequently actuated easily by any tire inflation device. Notwithstanding its remarkably high lift, it is inherently safe because of absence of tendency to expand unsymmetrically and because the flexible material envelopes irregularities and holds firmly in place during use. In the deflated condition it is of such small dimensions that it will fit inside of an ordinary automobile wheel rim and does not occupy space into which luggage could otherwise be stowed, as do conventional metal jacks.

We claim:

1. A pneumatic bag jack having an inflation valve, and which in its deflated condition has the general shape of a cylinder of a diameter several times as great as its axial length and with closed end faces, at least one end face of flexible nearly inextensible material having at least one annular corrugation immediately inside of its periphery and having its center essentially flat over a major part of the diameter of the end face.

2. A pneumatic bag jack according to claim 1 in which there are two corrugations in each end face.

3. A pneumatic bag jack according to claim 2 in which the material is resilient, vulcanized, rubberized fabric.